Patented Nov. 20, 1945

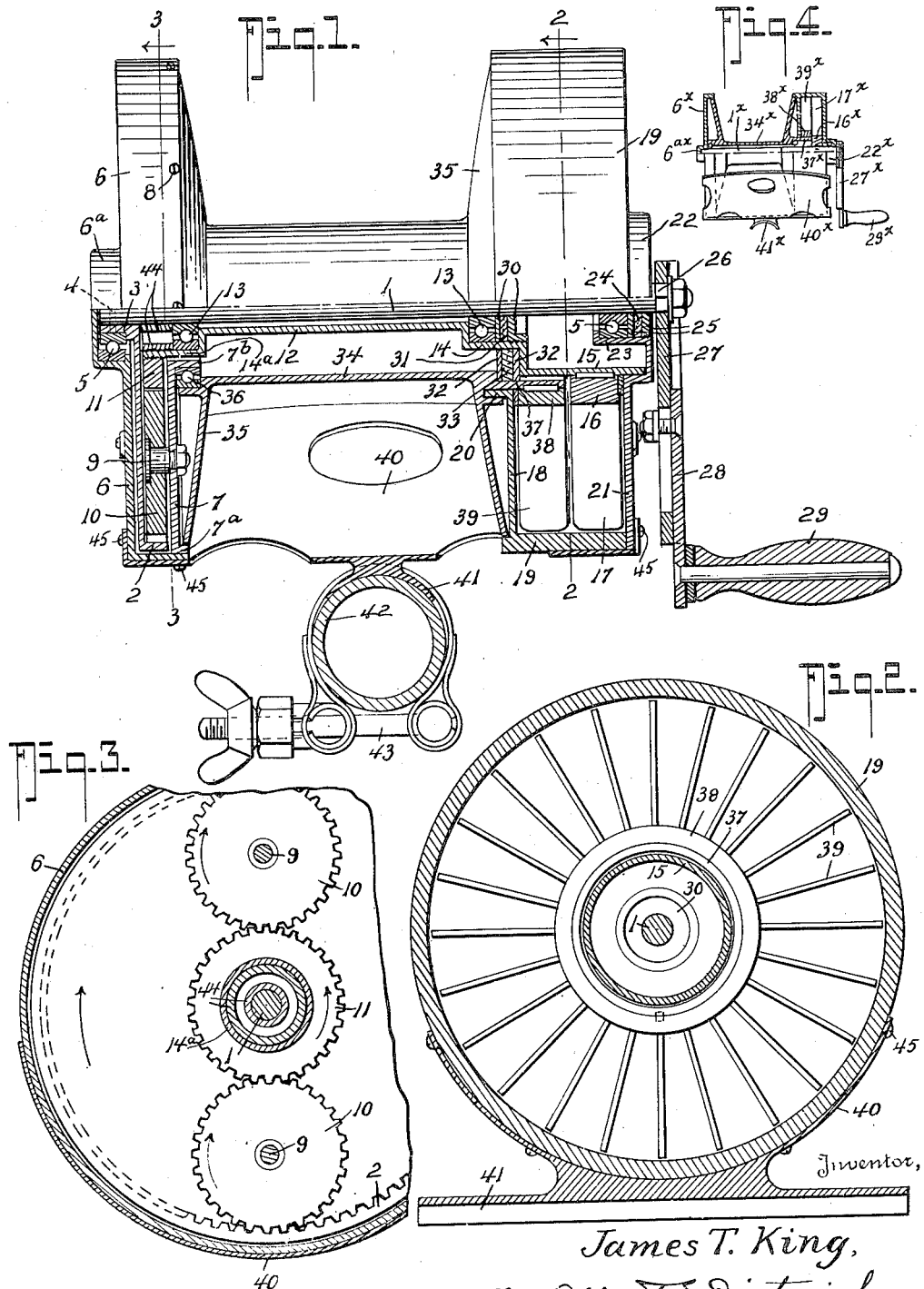

2,389,515

UNITED STATES PATENT OFFICE 2,389,515

FISHING REEL

James T. King, Burbank, Calif.

Application January 12, 1944, Serial No. 517,997

4 Claims. (Cl. 242—84.5)

My invention relates to fishing reels and more particularly to reels used in deep-sea fishing.

Primarily the invention has for an object to provide a reel of a simple construction in which a fluid drive is used to furnish a smooth flexible flow of rotational energy to the fishing line.

Other objects of the invention are to provide a reel without complicated gear trains; to provide a reel in which no intricate manually operated brake and drag mechanisms are necessary; to provide a reel in which the brake or drag function is performed by manipulation of the fluid drive; to provide a reel in which the internal mechanism is shielded from sand; and to provide a reel which does not require frequent dis-assembling for cleaning and lubricating purposes.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a part central vertical section and in part an elevation of one embodiment of my invention.

Fig. 2 is a cross section on the line 2—2 of Fig. 1.

Fig. 3 is a cross section on the line 3—3 of Fig. 1.

Fig. 4 is a part section and part elevation on a smaller scale illustrating another embodiment of the invention.

In the drawing in which like numerals and letters of reference indicate like parts in all the figures, 1 represents the crankshaft which, in the preferred form of the invention, carries a ring gear 2 having a hub 3 pinned, as at 4, or otherwise suitably secured to the shaft. The shaft 1 and hub 3 are mounted on anti-friction bearings 5, one of which is located in the bearing holder portion 6a of the gear housing 6, while the other of which is located in the gear holding portion 23 of the hollow shaft 12.

The gear housing 6 includes a cover 7 having a flange 7a and a hub 7b. The cover may be removably held in place in any suitable manner as, for example, by screws 8.

One or more gears 10, mounted on studs 9 that are secured to the cover 7, mesh with the ring gear 2 and with a gear 11 carried by the portion 14a of the tubular shaft 12.

The shaft 12 is preferably mounted on antifriction bearings 13 held in enlargements 14 and 14a, and on the shaft 1, by suitable retainers 44. The shaft 12 has a portion 15 located within the fluid-drive housing 18, 19, 21, that carries the hub 16 on which the driving vanes 17 are carried.

The side wall 18 of the fluid-drive housing has an annular oil seal portion 20 which also constitutes a bearing for that portion 37 of the spool 34 that carries the hub 38 of the driven vanes 39. The cover 21 has an off-set part 22 to receive a suitable oil seal which may comprise an expansible washer 24 held between two metal washers 25.

The shaft 1 may be provided with a square end 26 to receive an arm 27 having an adjustable extension 28 to carry a handle 29 by means of which the shaft 1 may be turned.

Other oil seals 30, 31 and 32, 33 may be provided where necessary to prevent leakage of the hydraulic fluid employed in the case 18, 19, 21.

The spool 34 has side flanges 35 and is mounted at its end remote from the fluid drive on an anti-friction bearing 36.

Saddle plates 40 are secured in any suitable way to the cases 6, 7 and 18, 19, 21 as for example, by screws 45, and have attached a saddle 41 to fit the fishing rod 42 to which the reel may be secured by the use of suitable clamps 43 such, for example, like those of the King Patent #2,270,375 issued January 20, 1942.

In using my reel the crank 28, 29 is turned with sufficient rapidity to turn the spool 34 backward and place the required pull on the line. Merely to exert a braking effect on the line the crank is turned slower. Deceleration of the reel handle speed allows an oil cushioned slippage to then function and applies a flexible free-acting braking force to the fishing line under tension; this reduces the chance or possibility of a broken fishing line, irrespective of the unknown weight of the fish.

The use of the King clamp mentioned enables a quick coupling and uncoupling of the reel to and from the rod.

In Fig. 4 is shown the simplest form the invention takes. In this figure those parts which correspond to similar parts in the preceding figures bear the same reference numbers as in the preceding figures plus the index letter $x$. In this embodiment the gearing between the shaft and the spool is eliminated and the fluid drive is direct from the shaft to the spool.

From the foregoing description taken in connection with the accompanying drawing it is thought the complete construction, operation and advantages of the invention will be clear to those skilled in the art to which it appertains.

What I claim is:

1. In a fishing reel: a gear case; a hydraulic transmission housing; a spool mounted between said case and said housing; a crankshaft passing through said spool, said transmission housing and into said case; a ring-gear on said shaft within said case; at least one idler gear rotatably mounted in said case and meshing with said ring-gear; a hollow shaft, said hollow shaft being located about said crankshaft and extending from said case to said housing; a gear on said hollow shaft meshing with said idler gear; driving vanes on said hollow shaft within said housing; driven vanes carried by said spool within said housing; and a hydraulic fluid within said housing.

2. In a fishing reel: a fishing reel support; a fishing reel spool rotatably mounted on said support; a crankshaft having a crank, said crankshaft passing through said spool; a closed housing through which said crankshaft also passes; a set of radial vanes within said housing and operatively connected with said spool; a second set of radial vanes within said housing alongside the first mentioned set of vanes and operatively connected with said crankshaft; and a liquid confined within said housing, in which said vanes are immersed.

3. In a fishing reel: a fishing reel support; a fishing reel spool rotatably mounted on said support; a crankshaft having a crank, said crankshaft passing through said spool; a closed housing through which said crankshaft also passes; a set of radial vanes within said housing and operatively connected with said spool; a second set of radial vanes within said housing alongside the first mentioned set of vanes and operatively connected with said crankshaft; and a liquid confined within said housing, in which said vanes are immersed, said sets of vanes being rotatable about a common axis.

4. In a fishing reel: a fishing reel support; a fishing reel spool rotatably mounted on said fishing reel support; a crankshaft with a hand crank, combined with a fluid drive operatively connecting said crankshaft with said spool, said fluid drive comprising a housing carried by said support, a liquid confined within said housing, vanes carried by said spool within said housing and other vanes within said housing and operatively connected with said crankshaft.

JAMES T. KING.